United States Patent [19]
Yamin et al.

[11] Patent Number: 5,576,119
[45] Date of Patent: Nov. 19, 1996

[54] RECHARGEABLE ELECTROCHEMICAL ALKALI-METAL CELLS

[75] Inventors: Herzel Yamin, Rehovot; Yacov C. Carmely, Bat-Yam, both of Israel

[73] Assignee: Tadiran Ltd., Holon, Israel

[21] Appl. No.: 254,029

[22] Filed: Jun. 3, 1994

[51] Int. Cl.$^6$ .................................................. H01M 4/58
[52] U.S. Cl. .............. 429/218; 429/192; 429/194; 429/207; 429/233; 429/234; 429/241; 429/242; 429/245; 429/247
[58] Field of Search ................... 29/623.1, 623.5; 429/218, 245, 192, 233, 234, 241, 242, 247, 194, 207

[56] References Cited

U.S. PATENT DOCUMENTS

| | | | |
|---|---|---|---|
| 4,423,125 | 12/1983 | Basu | 429/194 |
| 4,814,242 | 3/1989 | Maxfield et al. | 429/217 |
| 4,828,834 | 5/1989 | Nagaura et al. | 429/194 |
| 4,844,996 | 7/1989 | Peled et al. | 429/194 |
| 4,851,309 | 7/1989 | Toyoguchi et al. | 429/194 |
| 4,865,932 | 9/1989 | Yoshitomo et al. | 429/194 |
| 4,902,589 | 2/1990 | Dahn et al. | 429/94 |
| 4,939,050 | 7/1990 | Toyosawa et al. | 429/245 |
| 5,011,501 | 4/1991 | Shackle et al. | 29/623.1 |
| 5,028,500 | 7/1991 | Fong et al. | 429/198 |
| 5,252,413 | 10/1993 | Alamgir et al. | 429/192 |

FOREIGN PATENT DOCUMENTS

| | | |
|---|---|---|
| 2834485A1 | 2/1980 | Germany . |
| 2011699 | 7/1979 | United Kingdom . |
| 2060242 | 4/1981 | United Kingdom . |
| 2242566 | 10/1991 | United Kingdom . |
| WO90/13924n | 11/1990 | WIPO . |
| WO91/14025 | 9/1991 | WIPO . |

OTHER PUBLICATIONS

J. J. Auburn et al., "Lithium Intercalation Cells without Metallic Lithium:$MoO_2$/$LiCoO_2$ and $WO_2$/$LiCoO_2$", Extended Abstracts, vol. 86–2, No. 18, San Diego, pp. 28–29.

*Primary Examiner*—Bruce F. Bell
*Attorney, Agent, or Firm*—Ladas & Parry

[57] ABSTRACT

A rechargeable electrochemical cell comprising a first electrode capable of reversibly incorporating on the surface thereof an alkali metal, a second electrode capable of reversibly incorporating therein ions of the alkali metal, and an electrolyte in contact with the first and second electrodes, the cell being characterized in that prior to charging the surface of the first electrode is substantially free from the alkali-metal.

29 Claims, 1 Drawing Sheet

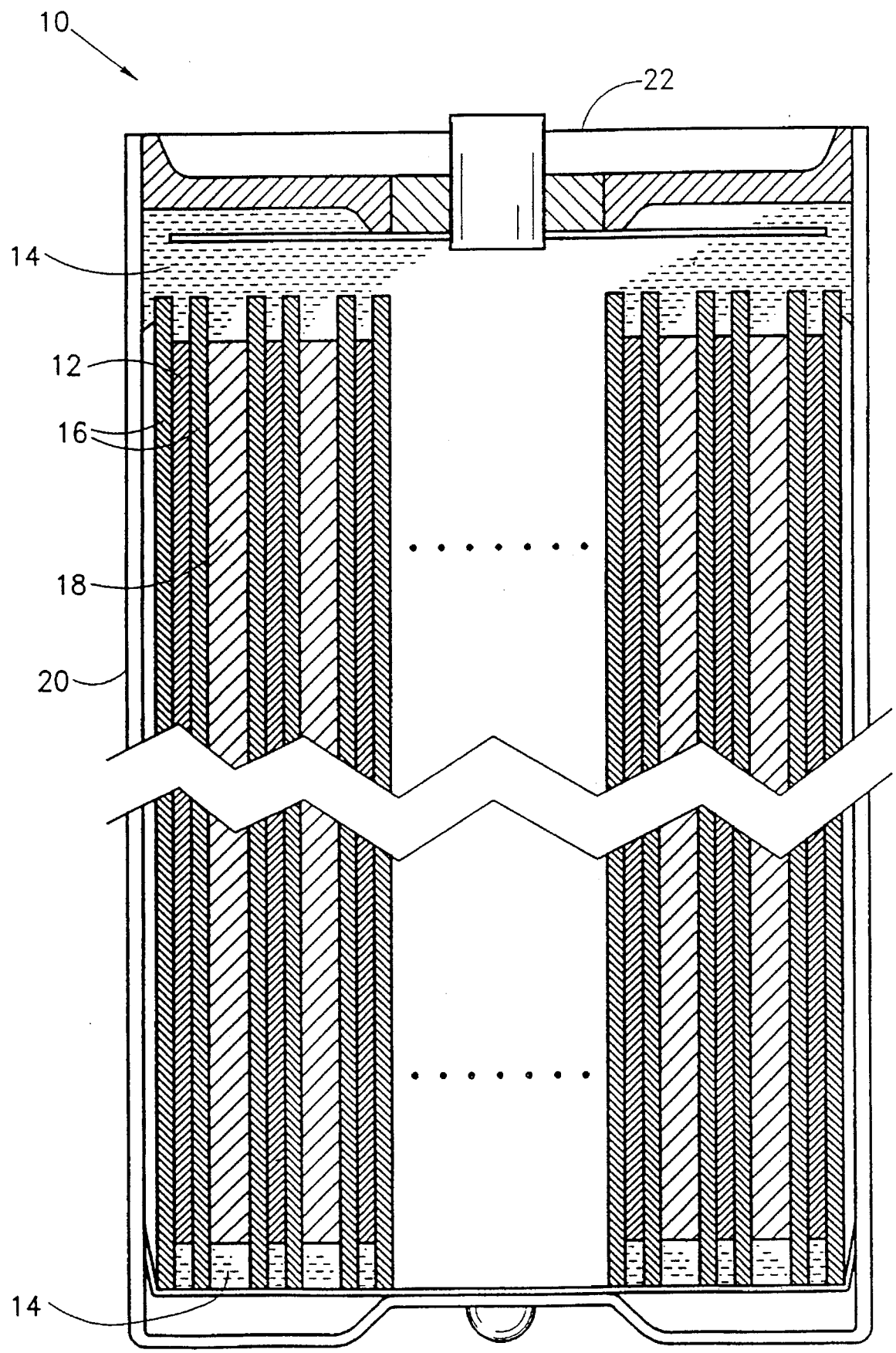

5,576,119

RECHARGEABLE ELECTROCHEMICAL ALKALI-METAL CELLS

FIELD OF THE INVENTION

The invention relates to rechargeable electrochemical alkali-metal cells such as rechargeable lithium batteries.

BACKGROUND OF THE INVENTION

Various non-aqueous alkali-metal electrochemical cells such as lithium cells are known in the art. Lithium cells, such as the one described in U.S. Pat. No. 4,828,834 to Nagaura et al. typically comprise a highly electroactive anode in the form of metallic lithium, a lithium salt dissolved in one or more organic solvents as the electrolyte, an electrochemically active cathode, which may be a chalcogenide of a transition metal or a metal oxide and a semipermeable separator placed between the anode and the cathode. The separator acts as a mechanical barrier against short-circuiting.

One drawback of lithium cells is that since metallic lithium is a highly reactive metal, it readily reacts with water vapor in air, and thus, lithium anodes must be manufactured in an entirely dry atmosphere.

Another drawback of lithium cells is the formation of lithium dendrites during the charge/discharge cycle. Lithium dendrites react with the electrolyte to form electrochemically non-active species which do not participate in subsequent charge/discharge cycles. This leads to lower discharge efficiency. Further, lithium dendrites can bridge the gap between the cathode and the anode and therefore cause cell failure via internal short-circuiting.

One way which partially overcomes low cell efficiency resulting from lithium dendrites formation is to resort to a large excess of lithium in the cell, typically a four fold excess. Lithium excess in the cell increases the thickness of the anode which is typically 150–200 microns in an AA size cell. As there exists a correlation between overall anode area and attainable power of the cell, the comparatively thick metallic lithium leads to a relatively low surface area and therefore to relatively low power density for the charge and for the discharge cycle. In addition, lithium excess in the cell reduces overall cell capacity, the larger lithium quantity is inherently more dangerous, and as lithium is comparatively expensive, cell cost is increased.

One approach to decrease dendrite formation is mechanical packaging under high pressure described in U.S. Pat. No. 4,902,589 to Dahn et al. A different approach is to charge the cell at relatively low current density, typically 0.3 mA/cm$^2$, which results in long charging times.

A different type of rechargeable lithium cells such as the one described in PCT Application PCT/CA90/00127 to Fong et al. include an anode comprising a suitable carbon form, such as coke or graphite, intercalated with lithium ions to form $Li_xC_6$, where x is lower than 1.

A drawback of lithium cells based on anodes made of lithium intercalated with carbon is that the maximum capacity derivable from such a cell is about 377 mAh/g which is considerably lower than the theoretical value of 3860 mAh/g for pure lithium metal. AA cells with a graphite intercalated anode such as the one described in U.S. Pat. No. 4,423,125 to Samar have a maximum capacity of the order of 500 mAh compared with 700 mAh for a cell with a lithium anode.

SUMMARY OF THE INVENTION

It is an object of the present invention to provide an improved rechargeable electrochemical cell. There is thus provided according to one aspect of the invention a rechargeable electrochemical cell comprising a first electrode capable of reversibly incorporating on the surface thereof an alkali metal, preferably lithium, a second electrode capable of reversibly incorporating therein ions of the alkali metal and an electrolyte in contact with both electrodes, the cell being characterized in that prior to charging, the surface of the first electrode is substantially free from said alkali-metal.

Further, there is provided according to another aspect of the invention a method of making a rechargeable electrochemical cell comprising the steps of assembling within a cell housing a film of conducting material substantially free from an alkali metal, preferably lithium, an electrode incorporating ions of the alkali metal therein and an electrolyte in contact with the film and said electrode incorporating a salt of the alkali metal, and applying an external electrical current to the cell, thereby plating the surface of the film with the alkali metal transferred as ions from the electrode to the surface of the film through the electrolyte.

Further, there is provided in accordance with another aspect of the invention a method for reducing dendrite formation in an electrochemical lithium cell comprising the steps of assembling in a cell housing in a sandwich like structure a film of conducting material essentially free of lithium, an electrode incorporating lithium ions therein, a non-conductive porous separator therebetween and a non-aqueous electrolyte in contact with the film, the electrode and the separator, and applying an external electrical current to the cell, thereby plating the surface of the film with lithium transferred as ions from the electrode to the surface of the film through the electrolyte, the method being characterized in that the increase in the thickness of the film due to said plating increases the internal pressure in the cell, thereby reducing lithium dendrite formation.

Further, in accordance with another aspect of the invention the electrolyte is a non-aqueous solvent having therein a salt of said alkali metal such as $LiAsF_6$, $LiBF_4$ and $LiClO_4$ or it is an ion conducting polymer, and the cell assembled with the non-aqueous solvent may also include porous non-conducting material for separating the first and second electrodes.

Further, in accordance with another aspect of the invention the surface of the electrode is a conducting metal whereas the electrode is made of one of the group of materials consisting of copper, nickel, stainless steel, or any of the materials coated with any other material therefrom or with gold. Alternatively, the electrode is an electron conducting polymer.

Finally, in accordance with another aspect of the invention the thickness of the first electrode is about 5 to 50 microns and the cell is characterized in that the thickness of the first electrode is considerably lower than the thickness of the second electrode.

BRIEF DESCRIPTION OF THE DRAWING

The present invention will be understood and appreciated more fully from the following detailed description taken in conjunction with the appended sole figure of the drawing which is a schematic cross section of a spiral wound type cell, constructed and operative in accordance with a preferred embodiment of the present invention.

DETAILED DESCRIPTION OF THE INVENTION

As illustrated in the drawing, a rechargeable electrochemical cell 10 according to one preferred embodiment of the present invention preferably comprises an anode 12 described in detail below, a non-aqueous lithiated electrolyte 14, a non-conductive microporous separator 16 and a cathode 18, such as an aluminum net supporting a lithiated metal oxide. The lithiated metal oxide can be a lithiated cobalt oxide, applied under pressure to both surfaces of such netting. Alternatively, the electrolyte and the non-conductive porous separator are replaced with a solid polymer electrolyte based on PVC/PC doped with lithium salt such as the one described in U.S. Pat. No. 5,252,413 to Alamgir, the content of which is incorporated herein by reference.

The anode in a cell according to a preferred embodiment of the present invention preferably comprises a support which is a thin conductive film on the surface of which a layer of an alkali metal, preferably lithium, is plated in-situ during charging of the cell in which the anode is fabricated.

The thin conductive film can be a metallic film such as copper, nickel or a stainless steel film. Alternatively, the thin conductive film can be a metal coated by another metal such as copper, nickel or stainless steel or it can be coated by chromium or gold. The thin conductive film can also be an electronic conductive polymer.

The thickness of the thin conductive film is preferably 5–50 microns and more preferably 8–20 microns in comparison with typical thicknesses of 150–200 microns of the cathode of prior art anodes. The advantageous mechanical properties of metals such as nickel, copper, stainless steel and electronic conductive polymer make it possible to use foils of only about 10 to 15 microns thickness and thus to attain a high overall surface area. For example, there were tried AA size cells with an anode area of about 400 $cm^2$, and such cells can be charged at comparatively high current, during a short charge time. Furthermore, the copper foil is less expensive than a lithium foil which is considerably thicker. The thin anode leaves more space for a comparatively thicker cathode. This results in a cell yielding high capacity and energy.

A preferred method for making a cell of the present invention is described with reference to a spiral wound type cell. It is to be appreciated that the method is not limited to a spiral wound type cell and is applicable to any type of cell. In order to fabricate such a cell, for example an AA size battery, a can made by any appropriate material such as nickel plated steel is used as the cell housing 20. Then, as illustrated in the drawing, a sandwich like laminar structure is assembled made of a layer of any of the foils described above to be used as the anode support, a layer of the permeable non-conductive porous separator and a layer of a lithium based cathode. Then, the layered structure is wound onto an inner core (not shown) affixed in the cell housing. Next, the electrolyte is introduced and finally the cap 22 is sealed to the can.

It is a particular feature of the present invention that the anode can be prepared in any environment. This is since the foil which is used for the anode support is essentially free from lithium before charging, and therefore there is no need to seclude the anode from the atmosphere.

Cells of the present invention are assembled in the uncharged state, and the charging of the cell is the first step when the cell is to be used. During the charging of the cell ions from the cathode pass via the electrolyte to the anode, and by this process lithium is plated on the support surfaces and a thin layer of lithium is formed thereon. Typically, the lithium layer would be 5 to 10 microns. Consequently, the overall thickness of the anode increases and this leads to an increase of the entire stack, and as this stack is confined in a case, the cell housing, internal pressure increases between the components. This pressure increase reduces dendrite formation. This minimizes the excess of lithium required and thus cell safety and overall energy obtainable from such cells are improved.

The following examples illustrate, but do not limit, certain aspects of the present invention.

EXAMPLE 1

An AA size test cell was fabricated using the following components:

A copper foil 15 microns thick was used as the anode support.

The cathode is made of $LiCoO_2$ pressed on both sides of aluminum foil support. Five weight percent graphite was used as a conductive material, and PVDF as binder.

Microporous polypropylene, "Celgard" type 3402 separating and disposed between the anode and the cathode. 1 Molar $LiAsF_6$ in a mixture of 1,3-dioxolane and tetrahydrofuran (THF) was used as an electrolyte.

The cell stack (the anode support, separator and the cathode) was assembled in a spiral wound configuration and inserted into a can made of nickel plated steel. The cover was hermetically sealed to the can by plasma welding. The electrolyte was introduced to the cell through a 1 mm opening in the can bottom. This was followed by resistance welding.

The thickness of the anode support was 15 microns, its width 40 mm and its length 550 mm. The cathode had the same width and length as the anode, but its thickness was much higher, 180 microns. This results in a potential electrode area of 440 $cm^2$.

About 1 hour after filling the electrolyte cell open circuit voltage (hereafter OCV) stabilized at a value of 0.32 volt.

The cell was charged by an average current of 250 mA. During charging cell voltage increased rapidly reaching a value of 3.9 V in 5 minutes. The cell reached a 4.1 volt cut-off value after 5.5 hours. The cell was discharged under a current of 250 mA giving a capacity of 1.2 Ah to 3.4 volt cut-off (at least 95% depth of discharge, hereafter DOD). The average working voltage was 3.8 V. This lead to an energy density of more than 500 Wh/L. After 10 deep charge/discharge cycles (at least 95% DOD) cell capacity decreased to 930 mAh. Cell capacity was above 830 mAh after 30 cycles.

COMPARATIVE EXAMPLE

A controlled AA size cell having 4 fold excess of lithium metal was constructed. The width of the anode and the cathode was 40 mm as in the cell of Example 1. The anode, however, was significantly thicker, 170 microns, in comparison to only 15 microns in the cell of Example 1. The length of the cathode and the anode was 270 mm. Therefore the electrode surface area was 216 $cm^2$.

The cell was charged and discharged at a current of 250 mA as in the case of the test cell. In the first discharge cycle the cell delivered only 640 mAh. Cell capacity decreased to 450 mA after 10 cycles. The cell was internally shorted during the charge process of cycle 24. This shorting occurred most likely due to the high charging current density which was 1.16 mA/cm² in the control cell, in comparison to 0.57 mA/cm² in the cell of Example 1.

EXAMPLE 2

A cell was made as the cell of Example 1, except that the anode support was made of a nickel foil 25 microns thick, and the cathode thickness was 170 microns.

The cell was charged and discharged under the same profile as in Example 1. In the first discharge cycle cell capacity was 1.1 Ah. This value gradually decreased to 0.95 Ah after 10 cycles.

EXAMPLE 3

A cell was made as the cell of Example 1 except that the anode support was made of 15 microns copper coated with 3 microns of nickel on each side. The cell OCV was 0.35 V. The cell was charged and discharged under the same profile as in Example 1 giving a capacity of 1.1 Ah in the first discharge cycle. Capacity decreased to a value of 0.8 Ah after 10 cycles.

EXAMPLE 4

A cell was made as the cell of Example 1 except that the cathode contained $LiNiO_2$ as active material. Open cell circuit potential was 0.75 Volt. Under the same charge/discharge regime as in Example 1 the cell delivered 0.95 Ah in the first cycle, a value that decreased to 0.70 Ah after 10 cycles.

EXAMPLE 5

A cell was made as the cell of Example 2 except that the cathode was made of $LiNiO_2$ as active material. The cell OVCV was 0.6 V. Under the same charge/discharge profile of Example 2 the cell delivered 1.0 Ah at the first discharge. Cell capacity decreased to 0.9 Ah after 10 cycles.

EXAMPLE 6

A cell was made as the cell of Example 1 except that the cathode was made of $LiMn_2O_4$ as active material. The cell OCV was 0.7 V. Under the same charge/discharge profile as in Example 1 the cell delivered 850 mAh in the first discharge, a value which decreased to 800 mAh after 10 cycles.

EXAMPLE 7

A cell was made as the cell of Example 1 except that the electrolyte was 1 Molar of $LiBF_4$ in a mixture of 1,3-dioxolane and THF. The cell OCV was 0.35 V. Under the same charge/discharge profile as in Example 1 the cell delivered 1.2 Ah in the first discharge. The capacity in cycle No. 10 decreased to 0.85 Ah.

EXAMPLE 8

A cell was made as the cell of Example 1 except that the electrolyte was 1.0 Molar of $LiClO_4$ in a mixture of propylene carbonate (PC) and diethyl carbonate (DEC). The cell OCV was 0.40 V. The cell was charged and discharged at the same regime of Example 1, except that the cut-off charge voltage was 4.2 V.

The cell delivered 1.25 Ah in the first discharge. Cell capacity decreased to 0.60 Ah at the 10th cycle.

EXAMPLE 9

A cell was made as the cell of Example 1. After charging the cell was disassembled. A uniform lithium plating on the copper foil was observed.

EXAMPLE 10

A laboratory type cell (Y. Geronov et al. J. of Electrochemical Society 137 (1990) 3338) was fabricated using a copper foil as the anode support, a solid polymer electrolyte based on PVC/PC doped with lithium salt and a lithium cobalt oxide based cathode as source for lithium ions.

The thickness of the copper foil was 15 microns, the solid polymer electrolyte 70 microns and the lithium cobalt oxide based cathode 100 microns. The active surface area was about 1 cm². Cell conductivity at 1000 Hz was 1.0 mMho at room temperature. The cell was charged with current density of 0.1 mA/cm2 at 60 degrees Celsius. During charging the cell voltage increased to 3.95 V after 30 minutes and stabilized at 4.05 V after 7 hours. The cell was discharged under the same current density for 3 hours to 3 V cut off value reaching an efficiency of 37%.

EXAMPLE 11

A cell was made as the cell of Example 10. After charging the cell was disassembled. A uniform lithium plating on the copper foil was observed.

Table 1 below summarizes experimental conditions and results of the above Examples 1–11.

It will be appreciated by persons skilled in the art that the present invention is not limited by what has been particularly shown and described hereinabove. Rather the scope of the invention is defined by the claims which follow:

TABLE I

| Example | Anode | Cathode | Electrolyte | Solvent | OCV(V) | Charge cut-off voltage | Capacity (Ah) 1st cycle | Capacity (Ah) 10th cycle |
|---|---|---|---|---|---|---|---|---|
| 1 | Copper | $LiCoO_2$ | $LiAsF_6$ | 1,3 dioxolane THF | 0.32 | 4.1 | 1.2 | 0.93 |
| 2 | Nickel | $LiCoO_2$ | $LiAsF_6$ | 1,3 dioxolane THF | 0.40 | 4.1 | 1.1 | 0.95 |
| 3 | Nickel plated on copper | $LiCoO_2$ | $LiAsF_6$ | 1,3 dioxolane THF | 0.35 | 4.1 | 1.2 | 0.80 |
| 4 | Copper | $LiNiO_2$ | $LiAsF_6$ | 1,3 | 0.75 | 4.1 | 0.95 | 0.70 |

TABLE I-continued

| Example | Anode | Cathode | Electrolyte | Solvent | OCV(V) | Charge cut-off voltage | Capacity (Ah) 1st cycle | Capacity (Ah) 10th cycle |
|---|---|---|---|---|---|---|---|---|
| 5 | Nickel | $LiNiO_2$ | $LiAsF_6$ | dioxolane THF 1,3 dioxolane THF | 0.60 | 4.1 | 1.0 | 0.90 |
| 6 | Copper | $LiMn_2O_4$ | $LiAsF_6$ | 1,3 dioxolane THF | 0.70 | 4.1 | 0.85 | 0.80 |
| 7 | Copper | $LiCoO_2$ | $LiBF_4$ | 1,3 dioxolane THF | 0.35 | 4.1 | 1.20 | 0.85 |
| 8 | Nickel | $LiCoO_2$ | $LiClO_4$ | PC/DEC | 0.40 | 4.2 | 1.25 | 0.60 |
| 9 | Copper | $LiCoO_2$ | $LiAsF_6$ | 1,3 dioxolane THF | 0.38 | 4.1 | 0.9 | — |
| 10 | Copper | $LiCoO_2$ | PVC/PC | $LiClO_4$ | 0.30 | 4.05 | 0.0003 | — |
| 11 | Copper | $LiCoO_2$ | PVC/PC | $LiClO_4$ | 0.30 | 4.05 | — | — |

We claim:

1. A rechargeable electrochemical cell comprising:
    a first electrode comprising a conductive metal which reversibly incorporates on the surface thereof an alkali metal;
    a second electrode which reversibly incorporates therein ions of said alkali metal; and
    an electrolyte in contact with said first and second electrodes,
    said first electrode having a surface substantially free from said alkali metal prior to charging of the cell.

2. A rechargeable cell according to claim 1 wherein said alkali metal consists essentially of lithium.

3. A rechargeable cell according to claim 1 wherein said electrolyte is a non-aqueous solvent having therein a salt of said alkali metal.

4. A rechargeable cell according to claim 3 and further comprising a porous non-conducting material separating said first and second electrodes.

5. A cell according to claim 3 wherein said non-aqueous solution is made of a material selected from the group consisting of $LiAsF_6$, $LiBF_4$ and $LiClO_4$.

6. A rechargeable cell according to claim 1 wherein said electrolyte is a solid ion conducting polymer.

7. A rechargeable cell according to claim 1 wherein the surface of said first electrode is a conducting metal.

8. A rechargeable cell according to claim 1 wherein said first electrode having a thickness from about 5 to 50 microns.

9. A rechargeable cell according to claim 1 wherein said first electrode is made of a material selected from the group consisting of copper, nickel and stainless steel, wherein said material is uncoated or coated with another material selected from the group consisting of copper, nickel, stainless steel and gold.

10. A rechargeable cell according to claim 1 wherein said second electrode having a thickness from about 50–200 microns.

11. A method of making a rechargeable electrochemical cell comprising the steps of:
    assembling within a cell housing a film of conducting metal substantially free from an alkali metal, an electrode incorporating ions of said alkali metal therein and an electrolyte in contact with said film and said electrode incorporating a salt of said alkali metal; and
    applying an external electrical current to said cell, thereby plating the surface of said film with said alkali metal transferred as ions from said electrode to the surface of said film through said electrolyte.

12. A method according to claim 11 comprising forming said alkali metal essentially of lithium.

13. A method according to claim 11, comprising forming said electrolyte as a non-aqueous solvent having therein a salt of said alkali metal.

14. A method according to claim 13, comprising forming said cell with a porous non-conducting material for separating said film and said electrode.

15. A method according to claim 13 comprising forming said non-aqueous solution from a material selected from the group consisting of $LIAsF_6$, $LIBF_4$ and $LICIO_4$.

16. A method according to claim 11, comprising forming said electrolyte as a solid ion conducting polymer.

17. A method according to claim 11, comprising forming the surface of said film as a conducting metal.

18. A method according to claim 11, comprising forming said film such that a thickness of said film is about 5 to 50 microns.

19. A method according to claim 11, comprising forming said film from a material selected from the group consisting of copper, nickel and stainless steel, wherein said material is uncoated or coated with another material selected from the group consisting of copper, nickel, stainless steel and gold.

20. A method according to claim 12 comprising forming said electrode such that a thickness of said electrode is about 50–200 microns.

21. A method of making a rechargeable electrochemical cell comprising the steps of:
    assembling in a cell housing a sandwich shaped structure of a film of conducting metal substantially free of lithium, an electrode incorporating lithium ions therein, a non-conductive porous separator therebetween and a non-aqueous electrolyte in contact with said film, said electrode and said separator; and
    applying an external electrical current to said cell, thereby plating a surface of said film with lithium transferred as ions from said electrode through said electrolyte, the method being characterized in that the increase in the thickness of the film due to said plating increases an internal pressure in the cell, thereby reducing lithium dendrite formation.

22. A method according to claim 21, comprising forming said electrolyte as a non-aqueous solvent having therein a salt of said lithium.

23. A method according to claim 22, comprising forming said cell with a porous non-conducting material separating said film and electrode.

24. A method according to claim 22 comprising forming said non-aqueous solution from a material selected from the group consisting of $LiAsF_6$, $LiBF_4$ and $LiClO_4$.

25. A method according to claim 21, comprising forming said electrolyte as a solid ion conducting polymer.

26. A method according to claim 21, comprising forming the surface of said film as a conducting metal.

27. A method according to claim 21, comprising forming said film such that a thickness of said film is about 5 to 50 microns.

28. A method according to claim 21, comprising forming said film from a material selected from the group consisting of copper, nickel and stainless steel, wherein said material is uncoated or coated with another material selected from the group consisting of copper, nickel, stainless steel and gold.

29. A method according to claim 21, comprising forming said electrode such that a thickness of said electrode is about 50-200 microns.

* * * * *